United States Patent Office 3,657,301
Patented Apr. 18, 1972

3,657,301
INHIBITION OF POLYMER AND OLEFIN FORMATION DURING ALUMINUM TRIALKYL GROWTH REACTION
Kaye L. Motz and Allan J. Lundeen, Ponca City, Okla., assignors to Continental Oil Company, Ponca City, Okla.
No Drawing. Continuation-in-part of application Ser. No. 862,075, Sept. 29, 1969. This application Nov. 26, 1969, Ser. No. 880,427
Int. Cl. C07f 5/06
U.S. Cl. 260—448 A
10 Claims

ABSTRACT OF THE DISCLOSURE

Carbon monoxide or other ligand for transition metals inhibits the formation of polymer and catalytic displacement when aluminum trialkyl such as aluminum triethyl is reacted with additional ethylene to form higher molecular weight aluminum trialkyls. It is also disclosed that carbon monoxide inhibits the hydrogenation reaction and therefore should be avoided in the reaction zone wherein aluminum triethyl, aluminum and hydrogen are reacted.

---

This is a continuation-in-part of our application filed Sept. 29, 1969, for "Inhibition of Polymer and Olefin Formation During Aluminum Trialkyl Growth Reaction" and having Ser. No. 862,075, now abandoned.

In our earlier-filed application we disclosed that the presence of carbon monoxide in the growth reactor inhibited polymer formation. Subsequent to filing the parent application, we have been able to more accurately define the preferred limits of carbon monoxide addition and disclose that certain other ligands which form a bond with transition metals are also operable.

BACKGROUND OF THE INVENTION

Field of the invention

This invention relates generally to the field of organo metal chemistry and particularly to aluminum alkyl growth reaction wherein an aluminum alkyl such as aluminum triethyl is reacted with ethylene to form aluminum trialkyls having a greater number of carbon atoms in the alkyl groups than did the starting aluminum trialkyl.

Description of the prior art

It is known to prepare synthetic fatty alcohols and olefins from aluminum alkyls. The over-all process generally involves preparing aluminum diethyl hydride by reacting aluminum triethyl, aluminum and hydrogen, ethylating the resulting aluminum diethylhydride with ethylene, recycling a portion of the resulting aluminum triethyl to the hydrogenation zone for preparation of aluminum diethylhydride and reacting the remaining aluminum triethyl with ethylene to form aluminum trialkyls having alkyl substituents containing 4 to 30 carbon atoms and either displacing the alkyl groups with ethylene to form olefins and aluminum triethyl or oxidizing the aluminum trialkyl and hydrolyzing to form alcohols and alumina or aluminum compounds such as alum, depending upon whether one hydrolyzes with water or an acid. The displacement can be thermal or catalyzed with a transition metal such as nickel. It is also known to form olefins by reacting ethylene in the presence of a small amount of aluminum triethyl which is believed to be a one-step growth and displacement reaction. The displacement reaction is reversible. It is also known that aluminum triethyl will catalyze the polymerization of ethylene. Thus, to obtain the desired reaction, the temperature, pressure, ratio of reactants and other conditions are controlled. Unfortunately, some of each reaction takes place under the usual conditions employed. In the growth reaction the conditions generally are: (1) temperature 225–260° F., (2) ethylene pressure 750–2500 p.s.i.g., and (3) residence time 1 to 4 hours, depending upon the Poisson distribution of alkyl lengths desired. Serious problems in the practice of the growth reaction have been the formation of unwanted polymer and olefin formation in the growth reactor. The latter has been particularly a problem when small amounts of nickel are present, such as is the case when nickel is used in the displacement reaction and the resulting aluminum triethyl is recycled for growth.

OBJECTS OF THE INVENTION

It is an object of this invention to inhibit the formation of ethylene polymer and olefins in the growth reactor wherein aluminum trialkyl is being reacted with ethylene to form aluminum triethyl having alkyl chains of a greater number of carbon atoms than those of the starting aluminum trialkyl. Other objects and advantages of the invention will be obvious to those skilled in the art having been given this disclosure.

SUMMARY OF THE INVENTION

According to this invention, the growth reaction is carried out in the presence of certain ligands which form a bond with transition metals. These ligands include carbon monoxide, nitric oxide and cyanides of the formula RCN wherein R can be hydrogen, alkyl, cycloalkyl, aryl or alkaryl. Preferably, at least 100 p.p.m. of the ligand is added to the growth reactor based on the ethylene charged to said reactor.

DESCRIPTION OF THE INVENTION

As has been indicated, aluminum trialkyls of low molecular weight are reacted with ethylene under known growth reaction conditions but in the presence of certain ligands for transition metals such as carbon monoxide to form aluminum alkyls having longer alkyl substituents than the starting aluminum alkyl. The original aluminum alkyl will generally be a symmetrical trialkyl having 2 to 4 carbon atoms in each alkyl substituent. That is, the starting material will be aluminum triethyl, aluminum tripropyl, and aluminum tributyl; however, it is known that the aluminum trialkyl can have more carbon atoms in the alkyl substituents and can have different alkyl chain lengths, e.g., aluminum diethylbutyl, aluminum ethylpropylbutyl, and the like. In practice, the aluminum trialkyl will generally be aluminum triethyl or aluminum tripropyl, depending upon whether one wants even or odd carbon atom end products, e.g., olefin or alcohol. The commercial operations at the present time start with aluminum triethyl.

We now believe that the transition metals catalyze the ethylene polymerization; and, since the growth reaction is carried out in steel reactors, the vessel itself has been, at least partially, responsible for polymer formation. Therefore, certain ligands which will form a bond with the transition metal are useful for inhibiting the polymer formation. Illustrative of such ligands include CO, NO, RCN, etc. R in the RCN can be hydrogen, alkyl, cycloalkyl, or aryl. Since carbon monoxide is readily obtainable and inexpensive, we prefer it; and the invention will be described with reference to carbon monoxide as the ligand for the transition metal.

It is preferred that the carbon monoxide be added to the growth reactor either separately or in admixture with the ethylene, since carbon monoxide also inhibits the hydrogenation reaction wherein the aluminum diethylhydride is formed.

The invention can be best understood by the following examples. Very small amounts of carbon monoxide are operable. We prefer at least 50 p.p.m. of carbon monoxide based on ethylene to prevent polymer formation, whereas up to 250 p.p.m. are desirable for inhibiting olefin formation. Subsequent to filing our earlier application we have found that when the carbon monoxide concentration is as low as 25 parts per million, some soft polymer is formed which is readily removed by solvent washing; and, even with as little as 10 p.p.m. CO in the ethylene, the polymer formation is reduced and that which is formed is soft. As the carbon monoxide content increases, the tendency to form polymer decreases, and such polymer as is formed becomes progressively softer and more readily dissolved in hot solvents such as kerosene and xylene. In our earlier-filed application we stated that our preferred upper limit of carbon monoxide was 500 p.p.m. Our work now indicates that 250 p.p.m. gives us substantially complete control of polymer formation and therefore consider the preferred range as being 50 to 250 p.p.m. carbon monoxide based on ethylene fed to the growth reactor. This is not to say, however, that 500 p.p.m. or greater is undesirable, but only that greater amounts do not appear to be necessary.

Example I

A series of runs was made to illustrate the effect of CO on polymer formation. The runs were made by adding aluminum triethyl as about 40 percent solution (ATE) in paraffin in the kerosene boiling range to a 100 milliliter glass lined stainless steel autoclave. The autoclave was then pressured to the desired level with carbon monoxide and pressured to 1000 p.s.i.g. with ethylene. The autoclave temperature was maintained to between 125 and 130° C. throughout the run. As the growth reaction proceeded, the pressure would drop off and the vessel would be again pressured to 1000 p.s.i.g. by additional ethylene. This procedure was continued until the desired ethylene take-up had been achieved. In some runs, a small amount of nickel as nickel naphthenate was added in order to promote displacement. That is, of the CO suppresses displacement in presence of a catalyst, it is obvious that CO would greatly minimize displacement in absence of a catalyst.

The results on polymer formation are shown in Table I. In the table, the polymer level is gaged by a rating of 0 to 10, wherein 0 is given when no polymer is formed and 10 when the autoclave was solid polymer.

TABLE I

| Run number | CO (p.s.i.) | Ni (p.p.m.) | Polymer level |
|---|---|---|---|
| 1 | 0 | 0 | 4 |
| 2 | 100 | 0 | 2 |
| 3 | 0 | 0 | 2 |
| 4 | 0 | 1 | 10 |
| 5 | 0 | 0 | 1 |
| 6 | 0 | 1 | 1 |
| 7 | 0 | 0 | 4 |
| 8 | 0 | 0 | 5 |
| 9 | 100 | 1 | 1 |
| 10 | 0 | 0 | 2 |
| 11 | 0 | 0 | 1 |
| 12 | 0 | 0 | 2 |
| 13 | 0 | 0 | 1 |
| 14 | 0 | 0 | 2 |
| 15 | 0 | 1 | 1 |
| 16 | 100 | 1 | 1 |
| 17 | 100 | 1 | 1 |
| 18 | 25 | 1 | 1 |

From Table I, it can be seen that, when carbon monoxide is present, the polymer formation was always low, whereas in the absence of carbon monoxide, it may or may not be low.

Those runs wherein nickel was added were also checked for olefins. The data are shown in Table II.

TABLE II

| Run number | Ni,* p.p.m. | CO, p.s.i.g. | Olefin Paraffin X100 | | |
|---|---|---|---|---|---|
| | | | $C_8$ | $C_{10}$ | $C_{14}$ |
| 4 | 1 | 0 | 59 | 56 | 24 |
| 6 | 1 | 0 | 72 | 63 | 46 |
| 9 | 1 | 100 | 38 | 36 | 33 |
| 15 | 1 | 0 | Essentially all butenes | | |
| 16 | 1 | 100 | 19 | 16 | 20 |
| 17 | 1 | 100 | 9 | 9 | 7 |
| 18 | 1 | 25 | 55 | 30 | 67 |

*Based on ATE solution.

From Table II it can be seen that carbon monoxide greatly reduces the olefin level when aluminum triethyl contaminated by nickel is subjected to growth conditions.

In addition to the above runs, normal displacement reactions with 50 p.p.m. Ni as the naphthenate are totally inhibited by the addition of 100 p.s.i. carbon monoxide.

Example II

A second series of runs was made wherein the ratio of carbon monoxide to ethylene was determined as described below. These runs were carried out in a one-liter stirred carbon steel autoclave.

Each growth was brought to run conditions using the following sequence:

| Temperature (° F.): | Ethylene pressure (p.s.i.g.) |
|---|---|
| Ambient | to 400 |
| 200 | to 800 |
| 220 | to 1200 |
| 240 | to 1600 |
| 250 | to 1800 |

The unit was held at 250° F. and 1800 p.s.i.g. for 2.5 hours. After 2.5 hours, the ethylene supply was shut off and the product cooled to 120° F. Growth product was removed from the autoclave at 120° F.

Normally 20 to 30 minutes were required to bring the unit to run conditions and 5 to 10 minutes were required to cool the product to 120° F.

Prior to the first series and series 11, the autoclave was sandblasted and "honed." At the end of each series of 5 runs, the autoclave was dismantled, examined for polymer and cleaned.

Between series 1 through 10 the unit was cleaned by blowing with compressed air and wiping with a dry towel. Between series 11 thru 15 the unit was washed with a hot solution of a household laundry detergent followed by an acetone and hexane rinse. No cleaning was done between runs within a series.

Each series consisted of 5 runs.

Carbon monoxide was added to the growth run either by preaddition or by premixing with the ethylene as follows:

Preaddition.—Carbon monoxide was added to the vapor space in the autoclave after the ATE (aluminum triethyl) feedstock was charged but prior to the addition of ethylene. The indicated carbon monoxide concentration shown in Table III is based on ethylene reacted during growth.

Ethylene mixture.—Carbon monoxide was mixed uniformly with the ethylene in the indicated amounts prior to charging the mixture to the autoclave.

The ATE was commercial ATE obtained from Continental Oil Company, The Ethyl Corporation and Texas Alkyls. The Continental Oil Company ATE was a 39 percent solution in paraffin hydrocarbon boiling in the kerosene range. The other two sources were 50 percent solutions in xylene.

The data from the runs are shown in Table III.

TABLE III

| Series No. | Feedstock source for ATE | Carbon monoxide treatment Type | Mol percent | Gram polymer per 1000 gm. $C_2H_4$ reacted |
|---|---|---|---|---|
| 1 | Ethyl | None | | 1.0. |
| 2 | Continental | do | | 1.6. |
| 3 | Texas Alkyl | do | | 1.3. |
| 4 | Continental | do | | 0.3. |
| 5 | do | Preaddition | 1.0 | Not measurable. |
| 6 | do | None | | 0.7. |
| 7 | do | Preaddition | 1.0 | Not measurable. |
| 8 | do | do | 1.0 | Do. |
| 9 | do | do | 0.1 | Do. |
| 10 | do | None | | 2.4. |
| 11 | do | Preaddition | 0.059 | Not measurable. |
| 12 | do | Premixing | 0.059 | Do. |
| 13 | do | do | 0.014 | Do. |
| 14 | do | None | | 0.3. |
| 15 | do | Premixing | 0.059 | Not measurable. |

From Table III it can be seen that very small amounts of carbon monoxide are operable for polymer inhibition. Even at 0.014 mol percent carbon monoxide based on ethylene, the polymer formed was so minute it could not be measured.

Analysis of CO in the growth reactor off gas was below analytical detection limits even when used at a level of 10,000 parts per million based on ethylene reacted. Such high level addition had no adverse effect on the growth reaction, and it appears that the maximum level is limited only by economic considerations.

In a commercial alcohol plant wherein alcohols are prepared by the aluminum alkyl process, it has been necessary for many years to shut the plant down at least once a week and sometimes oftener to remove solid polymer. A plant run was made wherein 100 p.p.m. carbon monoxide based on ethylene was fed to the growth reactor for ten and one-half days. At that time, the plant was shut down and the growth reactor inspected. The reactor appeared to be free of polymer including residual polymer formed since the previous shut-down and cleaning and before the test run was begun. Beginning about Oct. 14, 1969, the plant has been operating with carbon monoxide added to the growth reactor and up the filing of this application there has been no evidence of polymer formation in the growth reactor zone as was previously evidenced by increasing resistance or back pressure on the feed.

In like manner, 100 p.p.m. nitric oxide (NO) is added to the growth to inhibit polymer formation. 250 p.p.m. of a cyanide such as hydrogen cyanide, pentylcyanide, propylcyanide, benzylcyanide is added to the growth reactor to inhibit polymer formation. In these examples the p.p.m. is based on ethylene feed.

Having thus described the invention, we claim:

1. In the growth of aluminum alkyls with ethylene, the improvement comprising carrying out the process in the presence of a ligand which forms a strong bond with transition metals, said ligand being selected from the group consisting of carbon monoxide, nitric oxide, and cyanides of the formula RCN wherein R is hydrogen, alkyl, cycloalkyl, aryl, or alkaryl.

2. The improvement of claim 1 wherein the ligand is present in an amount of at least 10 p.p.m. based on ethylene reacted.

3. The improvement of claim 2 wherein the ligand is carbon monoxide.

4. The improvement of claim 3 wherein the carbon monoxide is present in the range 50 to 250 p.p.m. based on ethylene reacted.

5. In the growth of aluminum alkyls with ethylene, the improvement comprising introducing into the growth zone carbon monoxide in an amount sufficient to suppress polymer formation.

6. The improvement of claim 5 wherein the carbon monoxide is introduced into said growth reactor prior to the introduction of the ethylene.

7. The improvement of claim 6 wherein the carbon monoxide is present in an amount of at least 50 p.p.m. based on ethylene reacted.

8. The improvement of claim 5 wherein the carbon monoxide is premixed with the ethylene.

9. The improvement of claim 8 wherein the carbon monoxide is mixed with the ethylene in an amount to provide at least 50 p.p.m. of carbon monoxide based on the ethylene.

10. The improvement of claim 5 wherein the carbon monoxide is mixed with the ethylene in an amount to provide 50 to 250 p.p.m. based on the ethylene.

References Cited
UNITED STATES PATENTS

| | | | |
|---|---|---|---|
| 2,781,410 | 2/1957 | Ziegler et al. | 260—683.15 D |
| 2,889,314 | 6/1959 | Fritz | 260—683.15 D |
| 3,388,143 | 6/1968 | Rose | 260—448 A |
| 3,440,237 | 4/1969 | Mottus | 260—683.15 D |
| 3,457,321 | 7/1969 | Hambling et al. | 260—683.15 D |
| 3,502,741 | 3/1970 | Fernald et al. | 260—683.15 D |

TOBIAS E. LEVOW, Primary Examiner

H. M. S. SNEED, Assistant Examiner